Figure 1:
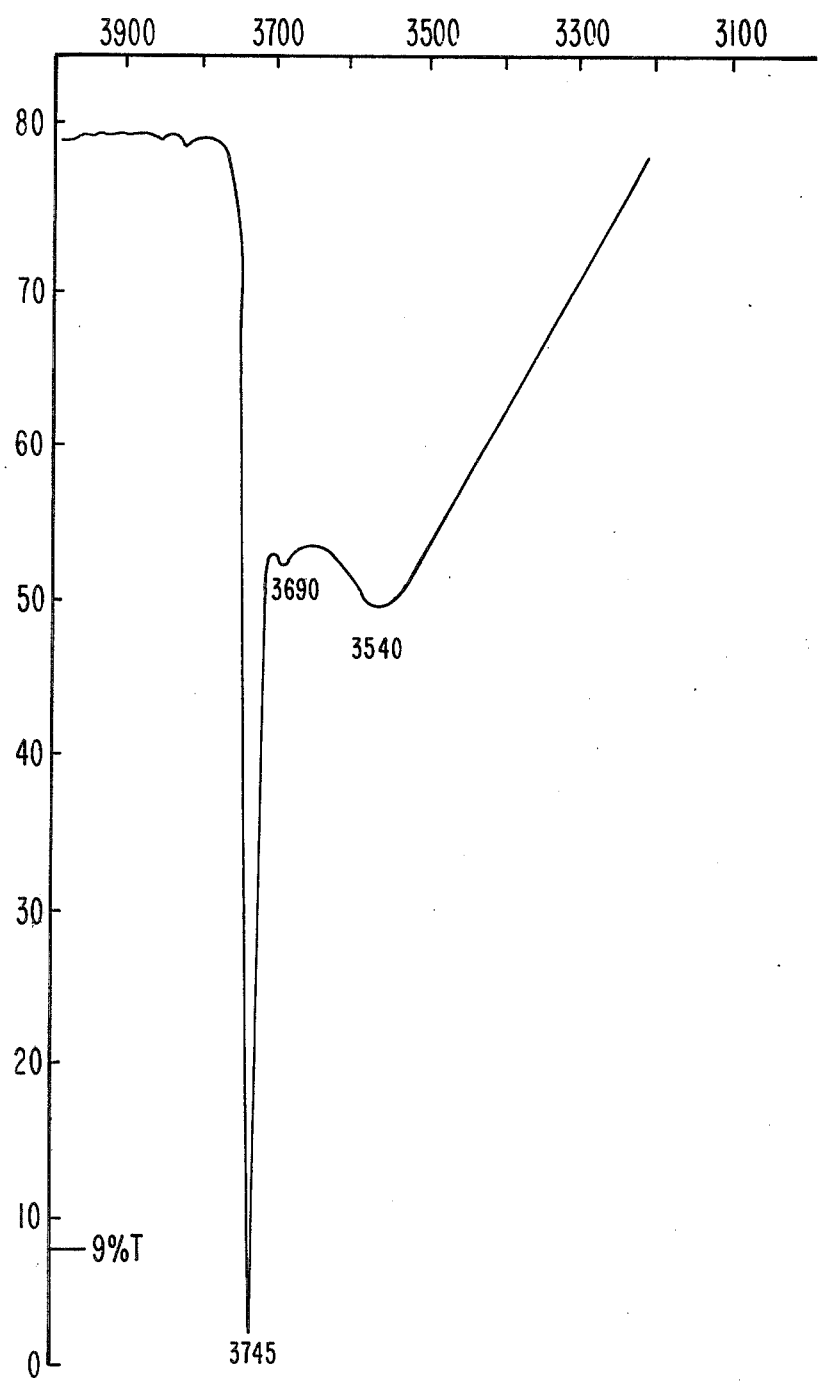

United States Patent [19]

Buonomo et al.

[11] 4,013,590

[45] Mar. 22, 1977

[54] PROCESS FOR PREPARING MATERIALS HAVING IMPROVED MECHANICAL AND THERMAL PROPERTIES AND MATERIALS OBTAINED THEREBY

[75] Inventors: Franco Buonomo; Vittorio Fattore; Bruno Notari, all of San Donato Milanese, Italy

[73] Assignee: Snam Progetti S.p.A., Milan, Italy

[22] Filed: Oct. 31, 1974

[21] Appl. No.: 519,792

[30] Foreign Application Priority Data

Oct. 31, 1973 Italy .................................. 30787/73

[52] U.S. Cl. .......................................... 252/455 R
[51] Int. Cl.$^2$ .......................................... B01J 29/06
[58] Field of Search ............... 252/451, 453, 455 R

[56] References Cited

UNITED STATES PATENTS

| 2,852,473 | 9/1958 | Welling | 252/451 |
| 3,416,888 | 12/1968 | Notari | 252/463 X |
| 3,535,232 | 10/1970 | Lawrance et al. | 252/455 R |

*Primary Examiner*—Carl F. Dees
*Attorney, Agent, or Firm*—Ralph M. Watson

[57] ABSTRACT

The mechanical and thermal properties of aluminum oxide, such as $\gamma$ alumina, adapted for use as a catalyst or catalyst carrier are improved through a treatment thereof with a silicon compound such as an alkyl orthosilicate in which the aluminum oxide is impregnated with the silicon compound or a solution thereof in a compatible organic solvent whose boiling point is lower than the boiling point of the silicon compound. The impregnated aluminum oxide is dried at a temperature in the range from above the boiling point of the silicon compound to 500° C and is then subjected to controlled oxidation.

9 Claims, 3 Drawing Figures

PROCESS FOR PREPARING MATERIALS HAVING IMPROVED MECHANICAL AND THERMAL PROPERTIES AND MATERIALS OBTAINED THEREBY

The present invention relates to a process for obtaining materials of high thermal and mechanical stability which are constituted by oxides of aluminium and more particularly, materials used as catalysts or as catalyst carriers for chemical reactions in the heterogeneous phase and also to the materials obtained thereby.

It is known that, when chemical processes are based on chemical reactions carried out by means of catalysts in the heterogeneous phase, the catalyst undergoes irreversible transformations which decrease the effectiveness thereof and necessitate the frequent replacement of the catalyst itself. Such a process would be improved by decreasing the rate of such transformations, which increases the efficacious employment period of the catalyst.

Generally the activity of a heterogeneous phase catalyst increases with increases of the catalyst surface in contact with the reagents. For this purpose use is made of catalysts having a high porosity and surface area which are carried on materials having such characteristics.

However the increase of the porosity and the surface area of the carriers and/or catalysts is generally obtained at the expense of their physical characteristics and, as a consequence, such catalysts or carriers undergo a quick deterioration over a long employment which causes a progressive reduction of the catalytic effectiveness.

Particularly this problem is remarkably present in the case of reactions carried out in the presence of a catalyst in a so called fluid bed and in the chemical reactions occurring in the catalytic muffler of an automobile wherein the catalyst undergoes a more or less quick decay, also because of the abrasion resulting from the impact of the granules upon one another and against the muffler walls, as a result of the vibrations due to the operation of the automobile.

When these materials are brought to high temperatures, the aforesaid phenomena are further emphasized: the increase of the mechanical strains joined to the thermal ones causes, on the one hand, a higher abrasion and mechanical breakage and, on the other hand, the decrease of the surface area because of sintering. Particularly such a problem occurs when these materials are used as catalyst carriers in automobile mufflers for the removal of the noxious components of the exhaust gases. In fact the temperatures that may be reached in the catalytic mufflers of automobiles are very variable and, sometimes on working, they may reach values higher than 1000° C; in such cases the usual materials used as carriers undergo thermal transformations which remarkably decrease the physical properties thereof and make them become very sensitive to the mechanical strains; moreover the shrinkage of the volume thereof because of the sinterization which affects the effective volume of the container, further overburdens the problems of resistance to compression and abrasion.

Heretofore methods have been proposed for improving the surface characteristics of alumina by means of a treatment with alkali, alkaline-earth metal compounds or with silicic acid or colloidal silica, but the obtained results that have been obtained have not been satisfactory.

The purpose of the present invention is to provide a method for improving the mechanical properties of materials constituted by oxides of alumina (e.g. $\gamma$-alumina, $\epsilon$-alumina, $\delta$-alumina, $\theta$-alumina; $\gamma$-alumina being preferred) through a simple and economical treatment.

According to a further aspect of the present invention there are provided modified aluminas having a high thermal and mechanical stability.

A third object of the present invention consists of the production of materials useful as catalysts or as catalyst carriers for reactions in the heterogeneous phase.

According to a particular aspect of the present invention there is provided a method for the production of alumina granules having high mechanical and thermal properties useful as catalyst carriers to be used in the catalytic mufflers of automobiles for the removal of noxious components in the waste gases.

The above and other purposes are achieved by the present invention through a simple and economical process consisting in treating the material formed from oxides of aluminum whose mechanical characteristics are to be improved, with a silicon compound and in subjecting the so obtained product to a drying and to a controlled oxidation.

The process of our invention may be carried out in the liquid phase, at atmospheric or higher pressure.

The process carried out in the liquid phase and atmospheric pressure consists of an impregnation, at room temperature, of the solid material with the silicon compound as such or in solution with other organic compounds having a boiling point preferably lower than that of the silicon compound and chemically compatible therewith (hydrocarbons, alcohols, etc.), and a heating of the so obtained composition to a temperature ranging from 50° to 500° C. Particularly use is made of a diluent when stated amounts, more or less low, of the silicon compound are to be deposited on the material which is to be modified. The process in the vapour phase and at atmospheric pressure is carried out by introducing the chosen silicon compound in a gas stream and feeding such a mixture onto the solid material at temperatures ranging from the boiling temperature of the silicon compound to 500° C, preferably between 100° and 400° C.

A preferred process, when large amounts of the silicon compounds are to be deposited, is the one in the liquid-vapour phase and aboveatmospheric pressure which is carried out in an autoclave at pressures in the range of from room pressure to 50 Kg/cm$^2$, and preferably from 10 to 30 kg/cm$^2$ and at temperatures ranging from the room temperature to 500° C, preferably from 100° to 400° C, over a period of from 1 to 20 hours.

The material, treated according to the aforesaid three processes, is further subjected to a thermal treatment under an inert gas stream at a temperature of from the boiling temperature of the silicon compound to 500° C over a period of from 1 to 5 hours, the material being finally treated with air at temperatures ranging from 300° to 600° C over periods ranging from 2 to 10 hours.

The thermal treatment under an inert gas atmosphere allows the removal, through carbonization or pyrolisis, of most of the organic material, which remains bond to the carrier, and, therefore, the following treatment with air does not promote local overheating, which would cause noxious modifications of the obtained product. Preferably the employed air is mixed with an inert gas, as such nitrogen, in order to control the oxidation temperature.

Alternatively the treatment with nitrogen may be replaced by a slow air oxidation, highly diluted by an inert gas.

The obtained materials, which are a further subject of the invention, have improved mechanical and thermal characteristics and a production cost not higher than that of the compounds which are not treated with the silicon compounds.

The silicon compound usefully employable according to the invention have the general formula

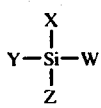

in which X, Y, Z and W may be (—R), (—OR), (—Cl), (—Br), (—F), (—SiH$_3$), (—COOR), (—SiH$_n$Cl$_m$), —[OSi(OR)$_2$] $_p$, OSi(OR)$_3$; (—R) being H, an alkyl, cycloalkyl, aromatic, alkyl-aromatic or alkyl-cycloalkyl radical having from 1 to 30 carbon atoms, such as, for instance, CH$_3$, —C$_2$H$_5$, isopropyl, n-propyl, normal-butyl, isobutyl, cyclohexyl, cyclopentyl, phenyl, phenylcyclohexyl, alkylphenyl; $n$, $m$ and $p$ being whole numbers in the range of from 1 to 3.

Among the abovecited compounds we prefer orthosilicic acid esters such as, for instance, methyl, propyl, isopropyl, isobutyl and normal butyl tetrasilicates.

The materials, which can be treated according to the inventive process, may be all oxides of aluminium, e.g. $\gamma$-alumina $\epsilon$-alumina, $\delta$-alumina $\theta$-alumina, among which $\gamma$-alumina is preferred.

The products obtained by the inventive process have mechanical and thermal characteristics very superior to the ones of the starting products and, upon chemical and physical-chemical analyses show surface structures and compositions substantially different from the starting ones.

In fact the infrared spectrum undoubtedly changes and the bands, characteristic of the silicon - hydroxyl band, prevail. Particularly in the case of alumina treated by the inventive process, we no longer observe the bands at 3795 and 3737 cm$^{-1}$ of the different hydroxyls present on the alumina surface, but we observe a band at 3745 cm$^{-1}$ characteristic of the hydroxyl group bound to silica.

In the following description, reference will be made to processes for the stabilization of $\gamma$-alumina which is used as carrier for catalysts of many chemical reactions carried out on industrial scale, and also to the so obtained stabilized aluminas which show, after a heating at 1200° C over a period of 24 hours, the only change from the phase to phase. Said aluminas, stabilized by a treatment over 40 hours at 250° C at a steam pressure of 15 atmosphere, keep unchanged their crystalline structure, their exceptional mechanical and thermal characteristics and the superficial area.

Moreover $\gamma$-alumina, stabilized according to the invention after a treatment at 1000° C over a period of 24 hours -, shows a volume shrinkage lower than 2%.

EXAMPLE 1

A spheroidal $\gamma$—Al$_2$O$_3$ (a) was prepared according to the process described in USP 3,416,888 owned by assignee of this application.

It consisted in dripping a mixture of ammonium acetate and aluminum chlorohydroxides and a suitable gelling agent into a mineral oil kept at 90° C.

On the column bottom we recovered little gel spheres which, suitably treated with NH$_3$ and washed with H$_2$O, crystallized into $\alpha$-monohydrate. The little spheres, dried and then calcined, changed into $\gamma$-Al$_2$O$_3$.

Alumina, obtained as described above, was examined with respect to resistance against abrasion before and after thermal treatment at 1000° and 1100° C for 24 hours, the volume shrinkage and the surface area variations after an analogous treatment.

The determination of the resistance against abrasion was carried out by employing a steel container, having 18 cc volume, which was 80% filled with the material to be examined.

A high frequency vibration, for over 30 minutes, was given to said container by means of a suitable apparatus.

Before the beginning of the tests the sample to be examined was kept in a stove to 150° C for 2 hours, was cooled to room temperature under an anhydrous atmosphere and then was weighed with great care. At the end of the abrasion tests, the recovered sample was sieved through a sieve which removed the granular fractions, was blown by air to remove the powder adhering the to little shperes, again dried at 150° C for 20 hours and then weighed.

The friction resistance (K) was expressed as weight percentage loss of the sample.

The results obtained from the various determinations are reported in table 1.

EXAMPLE 2

According to the procedure of example one, a spheroidal $\gamma$-Al$_2$O$_3$ was prepared containing 3% SiO$_2$ (b).

The product was obtained by adding colloidal silica Ludox AS (Du Pont) to a mixture of ammonium-acetate, aluminum chlorohydroxide and gelling agent.

On the sample so obtained were carried out the determinations of surface area, volume shrinkage and abrasion after a thermal treatment at 1000° C and 1100° C; the results of these determinations are listed in Table 1.

EXAMPLE 3

A sample of the same $\gamma$-Al$_2$O$_3$ used in the example 1 had Ba added thereto in the following way:

100 g of alumina were impregnated with a solution obtained by dissolving 9.8 g. of Ba (NO$_3$)$_2$ into 80 cc. of H$_2$O.

After drying at 120° C for 12 hours and an air calcination at 500° C for 2 hours, a $\gamma$-Al$_2$O$_3$ was obtained containing 5.2% of Ba (c). The determinations carried out on the sample so obtained are reported in Table 1.

EXAMPLE 4

By always employing same alumina as example 1, 100 g of Al$_2$O$_3$ were immersed in 200 cc of (C$_2$H$_5$O)$_4$ Si and kept in contact with the liquid for 4 hours; at the end the solid was separated from the excess liquid, and was transferred into a quartz pipe put in an electric oven; a nitrogen stream was sent and the whole was slowly heated up to the boiling temperature of ethylorthosilicate (160°–170° C) so as to completely distill the unreacted product. The thermal treatment was then prosecuted up to 500° C, when the nitrogen flow was stopped and air was sent; the duration of the final treatment was 2 hours. A product was obtained having a $SiO_2$ content equal to 6.1% (d). The results of the thermal treatments and the other determinations performed on the so obtained sample are reported in table 1. In table 1 there are reported also the results of X-ray examinations carried out on the samples of examples 1, 3 and 4 at 1100° C and 1200° C.

EXAMPLE 7

The alumina as example 5 was treated with $CH_3Si(OC_2H_5)_3$ in the vapour phase at room pressure in the following way: 100 g of alumina were put in a quartz pipe immersed in a heating oven; the pipe was bottom connected to a two necked flask, containing 30cc of methyltriethoxylane, and immersed in a thermostatic bath. Alumina was heated at 400° C under a nitrogen stream; this temperature having been achieved in the alumina bed, the thermostatic bath was brought up to 120° C and $N_2$ was sent to the flask containing $CH_3Si(OC_2H_5)_3$ until total vaporization of the silicon compound occurred.

TABLE 1

| SAMPLE | Starting SA $m^2/g$ | SA $m^2/g$ after treatment 1000° C | SA $m^2/g$ after treatment 1100° C | ΔV % after treatment 1000° C | ΔV % after treatment 1100° C | K % starting | K % after treatment 1000° C | K % after treatment 1100° C | R X after treatment 1100° C | R X after treatment 1200° C |
|---|---|---|---|---|---|---|---|---|---|---|
| a | 196 | 80 | 68 | 9 | 14 | 3.2 | 6.1 | 9.3 | THETA + ALPHA | ALPHA |
| b | 208 | 88 | 65 | 6 | 12 | 1.7 | 6.9 | 6.9 | n.d. | n.d. |
| c | 190 | 100 | 71 | 7 | 12 | 3.2 | 6.4 | 10.5 | THETA + DELTA | n.d. |
| d | 200 | 140 | 136 | 1 | 4 | 0.9 | 2.1 | 2.3 | DELTA | DELTA |

Wherein SA means the surface area, ΔV is the volume shrinkage expressed as percent, K is the friction resistance expressed as percent of abraded material.

By comparing the data of Table 1 it is possible to infer that the treatment of a $\gamma$—$Al_2O_3$ with $Si(OC_2H_5)_4$ causes a stabilizing effect much higher than that of other known common methods.

EXAMPLE 5

A spheroidal γ-alumina sample was prepared according the rotating plate pelletizing technique in the following way: $\gamma$—$Al_2O_3$, reduced into a very fine powder, was put in a rotating plate; while the plate was rotating, as aqueous solution containing 0.1% of hydrated methyl cellulose (Methocel) was nebulized onto the powder itself; spheroidal nuclei formed, the sizes of which could be regulated according to the residence time in the plate and the alumina powder present therein. When the desired sizes have been obtained, the alumina spheroids were dried for 24 hours at 120° C, then air calcined up to 500° C (e). The characteristics of these aluminas are illustrated in table 2. A sample of this alumina was immersed in an excess of $(C_2H_5O)_4$ Si; according to the same process as example 3, a $\gamma Al_2O_3$ was obtained containing 6.3% of $SiO_2$ (f). This sample too was subjected to the sinterization tests and the obtained results are reported in table 2.

EXAMPLE 6

100 g of the same alumina as example 5 were put in a self-heating autoclave together with 40 g of $(C_2H_5O)_4$ Si. The autoclave was evacuated and repeatedly washed with $N_2$ in order to remove all $O_2$ traces, then it was charged at a 5 kg/cm² pressure with $N_2$. The autoclave was heated to 200° C and this temperature was kept for 4 hours, at the end it was cooled, the pressure was released and alumina was recovered, which was subjected to a following thermal treatment of 2 hours at 200° C under $N_2$, and then to an air calcination at 500° C for 4 hours.

The $\gamma$-$Al_2O_3$ little spheres, treated in such a way, after analysis, showed a $SiO_2$ content equal to 10.2% (g).

The results of the sinterization tests are listed in table 2.

The treatment at 400° C was prosecuted with air for 4 hours, then the whole was cooled.

The $SiO_2$ content of the so treated alumina was equal to 8.5% (h). The sinterization tests gave the results listed in table 2.

EXAMPLE 8

100 g of the same alumina as example 5 were impregnated with an aqueous solution of orthosilicic acid obtained in the following way:

25 cc of sodium silicate (40 Be) were kept in 70 cc of $H_2O$; the solution was contacted with an ion exchange resin (Amberlite IRC-50 $H^+$) in order to completely remove $Na^+$ ions.

After the cationic exchange, the solution was utilized for impregnating alumina. After drying at 120° C and air calcination at 500° C for 4 hours, an alumina was obtained having a $SiO_2$ content equal to 6.5% (i).

The results of the sinterization tests, the sample was subjected to, are listed in table 2.

EXAMPLE 9

Another sample of the same alumina as example 5 was impregnated with colloidal silica Ludox SM (Du Pont) in the following way:

7 g of colloidal silica at 30% were diluted in 80cc of $H_2O$; 100g of alumina were impregnated with the resulting solution. After drying at 120° C for 12 hours and calcination at 500° C in air for 4 hours, an alumina was obtained containing 1.6% of $SiO_2$(l).

The results of the tests carried out on this sample are listed in table 2.

EXAMPLE 10

A sample of the same alumina as example 5 was treated with $SiCl_4$ in the vapour phase according to the following way: 100g of $Al_2O_3$ were put into a quartz pipe immersed in an electric oven; a nitrogen stream was sent and the sample was heated up to 400° C; then the pipe was connected to a saturating vessel containing $SiCl_4$ kept at room temperature, through which an anhydrous nitrogen stream flowed, which was then sent onto the alumina sample.

After 4 hours of treatment, the nitrogen flow through the saturating vessel containing SiCl$_4$ was stopped, and air was sent.

After 1 hour of air treatment it was cooled and alumina was recovered which, at analysis, showed a SiO$_2$ content equal to 7.3 (m).

The so obtained sample, subjected to sinterization tests, gave the results reported in table 2.

TABLE 2

| SAMPLE | SA m²/g starting | SA m²/g after treatment 1000° C | SA m²/g after treatment 1100° C | ΔV % after treatment 1000° C | ΔV % after treatment 1100° C | K % starting | K % after treatment 1000° C | K % after treatment 1100° C |
|---|---|---|---|---|---|---|---|---|
| e | 269 | 124 | 50 | 13 | 26 | 23.2 | 37.2 | 42.5 |
| f | 272 | 220 | 180 | 1 | 7 | 3.8 | 6.3 | 6.4 |
| g | 290 | 238 | 203 | 1 | 8 | 0.9 | 0.5 | 1.4 |
| h | 300 | 211 | 200 | 2 | 6 | 1.8 | 1.7 | 2.8 |
| i | 300 | 111 | 95 | 8 | 14 | 8.4 | 9.0 | 19.7 |
| l | 295 | 105 | 69 | 11 | 20 | 6.5 | 23.2 | 39.9 |
| m | 305 | 209 | 158 | 4 | 10 | 3.0 | 5.3 | 15.3 |
| n | 275 | 198 | 170 | 2 | 9 | 1.5 | 2.3 | 2.8 |

EXAMPLE 11

A drawing was performed of the same alumina prepared according to the process disclosed in example 5, which was treated with (CH$_3$O)$_2$ SiCl$_2$ in the following way: 100g of Al$_2$C$_3$ were put into a quartz pipe immersed in an electric oven; the pipe was connected to a N$_2$ stream and was heated up to 200° C; after 2 hours the pipe was connected to a saturation vessel containing (CH$_3$O)$_2$ SiCl$_2$, kept at 60° C, and through which an anhydrous N$_2$ stream was passed.

After 4 hours of this treatment, the vapour stream was stopped and air was sent; the temperature was raised to 500° C and the air treatment was prosecuted for 4 hours; at the end it was cooled and the material (n) was recovered, which was subjected to various tests in order to evaluate the thermal stability and mechanical characteristics thereof; the results of the performed tests are reported in table 2.

EXAMPLE 2

By using γ-Al$_2$O$_3$ of example 1, two tablets were prepared suitable to be examined at I.R.

Figure 2:
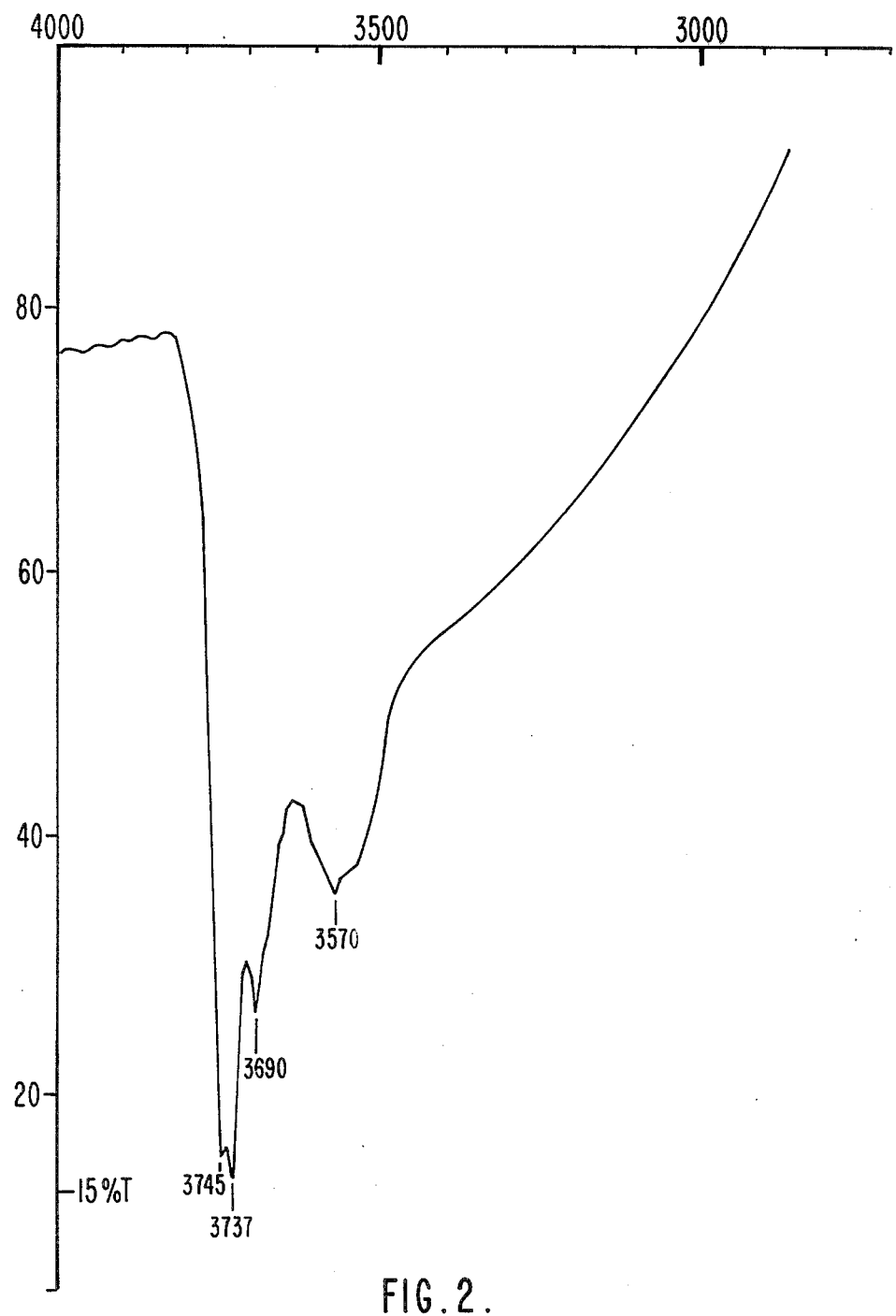

The first tablet was treated with ethyl orthosilicate under the same conditions and according to the procedure of example 6, the second one was treated with colloidal silica Ludox S.M. (Du Pont) according to the procedure of example 9. The so prepared two samples, after dehydration under vacuum at 450° C, were examined at I.R. and the spectrum is reported in the FIGS. 1 and 2, wherein the abscissae refer to the frequency of the infrared radiation expressed in cm$^1$ and the ordinates refer to the percentage transmission.

In the first case (FIG. 1) there was obtained an absorption spectrum typical of silica wherein a very clear band was observed at 3745 cm$^{-1}$, awarded to an Si–OH group with a disappearance of the bands at 3737 cm$^{-1}$ and 3795 cm$^{-1}$ and a strong attenuation of the bands at 3698 cm$^{-1}$ awarded to an Al—OH band.

In the second case (FIG. 2) there was obtained an overlapping absorption spectrum, typical of a mixture of silica and alumina, this latter being the prevailing one.

EXAMPLES 13–18

100 g of the same alumina as example 5 were put in a self-heating autoclave. The autoclave was evacuated and repeatedly washed with nitrogen in order to remove all oxygen traces: then, from time to time, the following amounts of silicon compounds were introduced:

| Example | | | |
|---|---|---|---|
| 13 | g 30 | of diethylchlorosilane | (C$_2$H$_5$)$_2$ SiCl$_2$ |
| 14 | g 17 | of tetramethylsilane | (CH$_3$)$_4$ Si |
| 15 | g 17 | of acetoxisilane | H$_3$Si (OOCCH$_3$) |
| 16 | g 18 | of methoxidisilane | CH$_3$OSiH$_2$ (SiH$_3$) |
| 17 | g 22 | of triethylsilane | (C$_2$H$_5$)$_3$SiH |
| 18 | g 45 | of polymethylsiloxane | (CH$_3$)$_3$SiO(CH$_3$)$_2$SiOSi(CH$_3$)$_3$ |

The pressure was brought to 5 Kg/cm² by nitrogen.

The autoclave was heated up to 200° C over 8 hours; at the end it was cooled, the pressure was released and alumina was recovered, which was heated in a quartz pipe under a nitrogen stream for 4 hours at 200° C, and then air calcined at 500° C for 4 hours.

The characteristics of these modified aluminas are emphasized in table 4, where are collected the results of the measurements carried out after the thermal ageing treatment at 1100° C for 24 hours.

For the sake of comparison, we report also the sample as such prepared according to example 1 (a).

EXAMPLE 19

100 g of the same alumina used in example 1 were immersed into 200 cc of (C$_2$H$_5$O)$_4$ Si and kept in contact with the liquid for 1 hour; at the end the solid was separated from the excess liquid in excess and was transferred into a quartz pipe immersed in an electric oven; a nitrogen stream was sent and the whole was heated to the boiling temperature of ethylorthosilicate, so as to completely distill the unreacted product.

After the end of the ethylorthosilicate distillation, the nitrogen flow was stopped, air was sent and the heating was prosecuted by gradually increasing the temperature; when this reached 350° C, determined on alumina, a combustion reaction was started on the organic groups bound to the alumina surface and on the condensation products thereof, therefor the temperature rapidly rose to 900°–1000° C.

The violent combustion occurring negatively affects the physical and mechanical characteristics of the final product, as it is possible to infer from the data of table 4.

TABLE 4

| EX-AMPLES | Starting SA m²/g | Sample K % | After treatment SA m²/g | After treatment k % at | 1100° C ΔV % |
|---|---|---|---|---|---|
| 13 | 193 | 1.9 | 110 | 4.5 | 7 |
| 14 | 190 | 2.3 | 112 | 5.2 | 5 |
| 15 | 205 | 1.4 | 108 | 3.6 | 5 |
| 16 | 203 | 3.1 | 131 | 4.3 | 5 |
| 17 | 198 | 2.8 | 119 | 4.8 | 6 |
| 18 | 195 | 2.3 | 121 | 4.7 | 6 |

TABLE 4-continued

| EXAMPLES | Starting SA m²/g | Sample K % | After SA m²/g | treatment k % at | 1100° C ΔV % |
|---|---|---|---|---|---|
| 19 | 192 | 1.8 | 102 | 7.8 | 10 |
| a | 196 | 3.2 | 68 | 9.3 | 14 |

EXAMPLE 20

By using two samples of γ-alumina, the former prepared according to example 1 and the latter according to example 4, hydrothermal treatments were carried out, at growing times, at 250° C, 300° C and 350° C.

15 g of the two samples were introduced into two test tubes, which were put into 0.5 l autoclave to which 10 cc of water were added.

The autoclave temperature was brought to the stated temperature (250° C, 300° C, 350° C) and the pressure was regulated at a steam pressure 15 atmospheres by means of a manometer suitably connected to the autoclave, made possible by releasing the excess pressure through a suitable valve.

Figure 3:
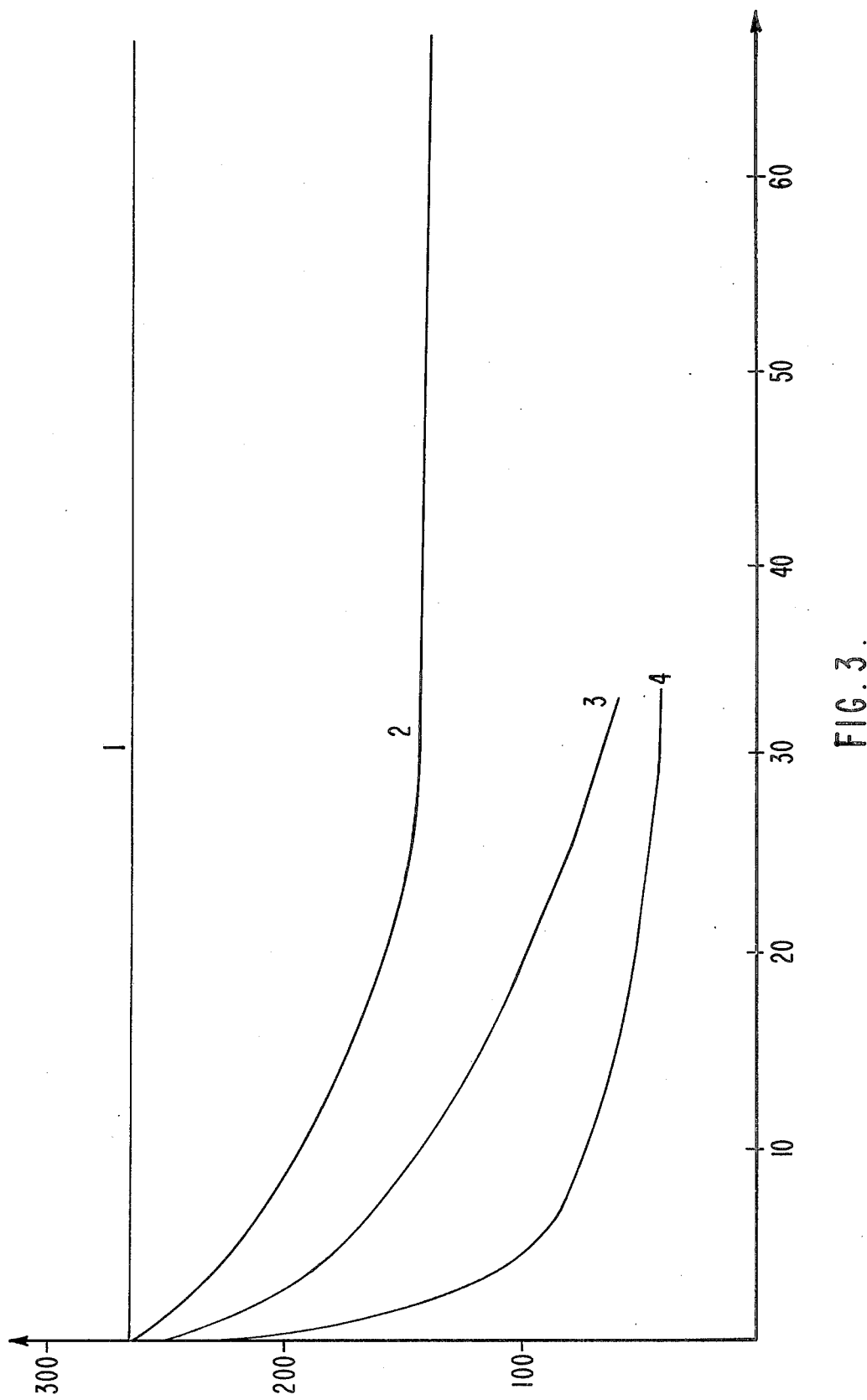

The surface area of the samples, so treated over periods of from 4 to 64 hours is reported in the diagram of FIG. 3, wherein the abscissae refer to the treatment duration and the ordinates relate to the surface area (m²/g). It is to be noted that the stabilized alumina (curve 1) does not undergo any modification, whereas alumina as such (curves 2, 3, 4) undergoes progressive decreases of the surface area which means, as confirmed by X-ray analyses, a change, higher and more higher, of γ-alumina into aluminum monohydrates.

The curve 1 refers to the three temperature values, whereas the curve 2 refers to 350° C, the curve 3 to 300° C and the curve 4 to 250° C.

What we claim is:

1. The process of improving the mechanical and thermal properties of aluminum oxide adapted for use as a catalyst or catalyst carrier which comprises impregnating said aluminum oxide with a silicon compound having the general formula:

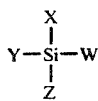

in which X, Y, Z and W are selected from the group consisting of (—R), (—Cl), (—Br), (—SiH), (—COOR), (—SiH Cl), — [OSi(OR)]$_p$, OSi, (OR)$_3$, in which R is an alkyl, cycloalkyl, aromatic alkylaromatic or alkyl-cycloalkyl radical having from 1 to 30 carbon atoms; $n$, $m$ and $p$ are whole numbers from 1 to 3, by bringing said silicon compound or a solution thereof in a compatible organic solvent whose boiling point is lower than the boiling point of the silicon compound into contact with said aluminum oxide, drying said impregnated aluminum oxide at a temperature in the range of from the boiling point of the silicon compound to 500° C, and then subjecting said impregnated aluminum oxide to controlled oxidation.

2. Process according to claim 1, wherein said silicon compound is an alkyl orthosilicate.

3. Process according to claim 1, wherein said impregnation with the silicon compound is carried out in the liquid phase at atmospheric pressure and in the temperature range of from 50° to 500° C.

4. Process according to claim 1, wherein said impregnation with the silicon compound is carried out in the vapour phase at atmospheric pressure by flowing the silicon compound in an inert gas stream onto the aluminum oxide which is to be treated.

5. Process according to claim 1, wherein said aluminum oxide which is to be treated and the silicon compound are contacted in the pressure range of from room pressure to 50 kg/cm² and at temperatures ranging between the room temperature and 500° C.

6. Process according to claim 1, wherein the oxidation is carried out under an air stream at 500° C.

7. Process according to claim 1, wherein the aluminum oxide material is γ-alumina.

8. Stabilized alumina having a silicon content, expressed as silicon atoms per A² of area, of from 0.01 to 0.06 which shows, after a treatment at 1200° C over a period of 24 hours, no transformation other than from phase to phase, and which, after a treatment for 40 hours at 250° C under a steam pressure of 15 ata, keeps unchanged its starting crystalline structure and, after a treatment at 1000° C for 24 hours, shows a volume shrinkage lower than 2%.

9. Stabilized alumina according to claim 8, which shows an infrared adsorption spectrum having a very strong band at 3745 cm$^{-1}$ characteristic of the group Si—OH and very weak bands or no band at 3795 cm$^{-1}$ and 3737$^{-1}$ awardable to hydroxyls at the alumina surface.

* * * * *

UNITED STATES PATENT AND TRADEMARK OFFICE
CERTIFICATE OF CORRECTION

PATENT NO. : 4,013,590               Page 1 of 2

DATED : March 22, 1977

INVENTOR(S) : Franco Buonomo, Vittorio Fattore and Bruno Notari

It is certified that error appears in the above-identified patent and that said Letters Patent are hereby corrected as shown below:

Column 1, line 25, After "area" insert --or--.

Column 3, line 3, Correct "as such" to read --such as--.

Column 4, line 32, Correct spelling of "spheres".

Column 5, line 28, "$\gamma -- Al_2O_3$" should read --$\gamma -Al_2O_3$--.

line 35, "$\gamma -- Al_2O_3$" should read --$\gamma -Al_2O_3$--.

Column 7, line 41, Correct "Example 2" to read --Example 12--.

line 52, Correct "abscissaerefer" to read --abscissae refer--.

Column 8, line 44, Delete "in excess".

UNITED STATES PATENT AND TRADEMARK OFFICE
CERTIFICATE OF CORRECTION

PATENT NO. : 4,013,590

DATED : March 22, 1977

INVENTOR(S) : Franco Buonomo, Vittorio Fattore and Bruno Notari

It is certified that error appears in the above-identified patent and that said Letters Patent are hereby corrected as shown below:

Column 9, line 20, After "pressure" insert --of--.

line 33, After "and" delete --more--.

Column 10, line 4, After "aromatic" insert a comma --,--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,013,590
DATED : March 22, 1977
INVENTOR(S) : Franco Buonomo, Vittorio Fattore and Brono Notari It is certified that error appears in the above-identified patent and that said Letters Patent are hereby corrected as shown below:

Column 10, line 3, correct "(-SiHCl)" to read --$(-SiH_nCl_m)$--.

Signed and Sealed this

Ninth Day of May 1978

[SEAL]

Attest:

RUTH C. MASON
Attesting Officer

LUTRELLE F. PARKER
Acting Commissioner of Patents and Trademarks